US007348289B2

(12) United States Patent
Ichikawa et al.

(10) Patent No.: US 7,348,289 B2
(45) Date of Patent: Mar. 25, 2008

(54) CATALYST BODY

(75) Inventors: Shuichi Ichikawa, Handa (JP); Yasushi Uchida, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 244 days.

(21) Appl. No.: 10/535,702

(22) PCT Filed: Nov. 19, 2003

(86) PCT No.: PCT/JP03/14725

§ 371 (c)(1), (2), (4) Date: May 19, 2005

(87) PCT Pub. No.: WO2004/047984

PCT Pub. Date: Jun. 10, 2004

(65) Prior Publication Data

US 2006/0014636 A1 Jan. 19, 2006

(30) Foreign Application Priority Data

Nov. 22, 2002 (JP) ............................ 2002-338745

(51) Int. Cl.
*B01J 21/18* (2006.01)
*B01J 21/00* (2006.01)
*B01J 27/20* (2006.01)

(52) U.S. Cl. ...................... 502/174; 502/240; 502/243; 502/245; 502/247; 502/255; 502/256; 502/257; 502/258

(58) Field of Classification Search ................ 502/174, 502/240–258
See application file for complete search history.

(56) References Cited

U.S. PATENT DOCUMENTS

| | | | | |
|---|---|---|---|---|
| 5,340,548 | A * | 8/1994 | Abe et al. | 422/177 |
| 5,846,460 | A * | 12/1998 | Matsuura et al. | 264/43 |
| 6,613,299 | B2 * | 9/2003 | Dang et al. | 423/239.1 |
| 6,649,593 | B1 * | 11/2003 | Jaen et al. | 514/18 |
| 6,764,665 | B2 * | 7/2004 | Deeba et al. | 423/239.1 |
| 2002/0169818 | A1 * | 11/2002 | Stewart et al. | 709/202 |
| 2004/0033893 | A1 * | 2/2004 | Tomita et al. | 502/178 |
| 2004/0161596 | A1 * | 8/2004 | Taoka et al. | 428/304.4 |

FOREIGN PATENT DOCUMENTS

| | | |
|---|---|---|
| JP | A 10-137590 | 5/1998 |
| JP | A 2002-059009 | 2/2002 |
| JP | A 2002-095968 | 4/2002 |
| JP | A 2002-282634 | 10/2002 |

* cited by examiner

*Primary Examiner*—J. A. Lorengo
*Assistant Examiner*—Patricia L Hailey
(74) *Attorney, Agent, or Firm*—Oliff & Berridge, PLC

(57) ABSTRACT

A catalyst body of the present invention includes: a porous carrier in which a large number of aggregate particles containing a main component of a nonoxide ceramic are bonded to one another while a large number of pores are disposed; and a catalyst layer carried on the porous carrier and containing a compound of an alkali metal, wherein the porous carrier has an oxide film unavoidably formed on a part of the surface of the aggregate particles, and an oxide film protective layer formed of a material which does not form low-melting glass with the alkali metal is further disposed between the oxide film and the catalyst layer in such a manner as to coat at least a part of the oxide film.

13 Claims, 1 Drawing Sheet

3
1
3
4
4

CATALYST BODY

TECHNICAL FIELD

The present invention relates to a catalyst body preferably usable for purification of an automobile exhaust gas, particularly to a catalyst capable of effectively preventing a drop of catalyst activity in a case where a nitrogen oxide trap catalyst such as an alkali metal is carried on a catalyst carrier formed of a nonoxide ceramic or the like.

BACKGROUND ART

In recent years, automotive exhaust gas regulation has been strengthened, a lean-burn engine, a direct jet engine and the like have spread, and accordingly a nitrogen oxide trap catalyst (hereinafter referred to as "$NO_x$ trap catalyst") has been put to practical use, which is capable of effectively purifying nitrogen oxide ($NO_x$) in an exhaust gas in a lean atmosphere. The $NO_x$ trap catalyst contains effective components such as alkali metals (potassium (K), sodium (Na), lithium (Li), cesium (Cs), etc.), alkali earth metals (barium (Ba), calcium (Ca), etc.), and rare earths (lanthanum (La), yttrium (Y), etc.). Especially, barium has been broadly used from the beginning of the practical use of the $NO_x$ trap catalyst. In recent years, addition of potassium has been attempted which is superior in a nitrogen oxide trap ability (hereinafter referred to as "$NO_x$ trap ability").

This $NO_x$ trap catalyst is usually used in the form of a catalyst carried on a catalyst carrier formed of an oxide ceramic such as cordierite.

However, the catalyst carrier formed of the oxide ceramic easily degrades by corrosion of the alkali metal or alkali earth metal (hereinafter referred to as "the alkali metal or the like") which is activated at a high temperature by the exhaust gas, especially lithium, sodium, potassium, calcium or the like, and there has been a problem that cracks are generated in the catalyst carrier, when the degradation progresses. Since the alkali metal or the like reacts with the catalyst carrier and is consumed, there has also been a problem that a catalyst performance drops with time.

To solve the problems, a method has been proposed in which the surface of the catalyst carrier is coated with a certain coating layer, and the $NO_x$ trap catalyst is carried on the coating layer (e.g., Japanese Patent Application Laid-Open Nos. 10-137590, 2002-59009, etc.). According to these methods, diffusion of the alkali metal or the like to the catalyst carrier, and further reaction of the alkali metal or the like with the catalyst carrier are suppressed by the coating layer, it is possible to avoid the above-described problems.

Additionally, in recent years, a nonoxide ceramic such as silicon carbide has been noted as a material constituting the catalyst carrier. The nonoxide ceramic is superior in heat resistance or chemical durability, and does not easily react with the alkali metal or the like which is the $NO_x$ trap catalyst even at the high temperature by the exhaust gas. Therefore, unlike the oxide ceramic, the problems do not occur that the cracks are generated in the catalyst carrier and the catalyst activity drops.

However, in actual, when the alkali metal or the like is carried by the catalyst carrier formed of the nonoxide ceramic, any crack is not generated in the catalyst carrier, but there has been a problem that the catalyst activity drops more then expected with use time.

DISCLOSURE OF THE INVENTION

The present invention has been developed in view of the above-described problems of the conventional technique, and an object thereof is to provide a catalyst body which produces an advantageous effect that a drop of catalyst activity is effectively prevented as compared with a conventional catalyst in a case where an alkali metal or the like which is an $NO_x$ trap catalyst is carried on a catalyst carrier formed of a nonoxide ceramic.

As a result of intensive researches to solve the above-described problems, the present inventor has found that the above-described problems can be solved, when disposing an oxide film protective layer formed of a material which does not form low-melting glass with an alkali metal or the like between an oxide film unavoidably formed in some of the surfaces of aggregate particles and a catalyst layer in such a manner as to coat at least a part of the oxide film in a porous carrier containing a main component of a nonoxide ceramic or the like, and the present invention has been completed. That is, the present invention provides the following catalyst.

[1] A catalyst body comprising: a porous carrier in which a large number of aggregate particles containing a main component of a nonoxide ceramic and/or a metal are bonded to one another while a large number of pores are disposed; and a catalyst layer carried on the porous carrier and containing a compound of an alkali metal and/or an alkali earth metal, wherein the porous carrier has an oxide film unavoidably formed on a part of the surface of the aggregate particles, and an oxide film protective layer formed of a material which does not form low-melting glass with the alkali metal and/or alkali earth metal is further disposed between the oxide film and the catalyst layer in such a manner as to coat at least a part of the oxide film.

[2] The catalyst body described in the above [1], wherein the porous carrier contains a main component of the nonoxide ceramic containing a silicon (Si) element and/or metal silicon.

[3] The catalyst body described in the above [1] or [2], wherein the porous carrier contains a main component of at least one selected from the group consisting of silicon carbide (SiC), metal silicon bonded silicon carbide (Si—SiC), and silicon nitride ($Si_3N_4$).

[4] The catalyst body described in any of the above [1] to [3], wherein the oxide film contains a main component of silica ($SiO_2$).

[5] The catalyst body described in any of the above [1] to [4], wherein the material which does not form the low-melting glass with the alkali metal and/or alkali earth metal is a compound of at least one element selected from elements belonging to the group A:

the group A: scandium (Sc), titanium (Ti), vanadium (V), chromium (Cr), manganese (Mn), iron (Fe), cobalt (Co), nickel (Ni), copper (Cu), zinc (Zn), gallium (Ga), germanium (Ge), yttrium (Y), zirconium (Zr), niobium (Nb), molybdenum (Mo), tin (Sn), and antimony (Sb).

[6] The catalyst body described in the above [5], wherein the material which does not form the low-melting glass with the alkali metal and/or alkali earth metal is a compound of at least one element selected from the group consisting of zirconium (Zr) and titanium (Ti) among the elements belonging to the group A.

[7] The catalyst body described in any of the above [4] to [6], wherein an oxide of the alkali metal and/or alkali earth metal, the material which does not form the low-melting glass with the alkali metal and/or alkali earth metal, and silica ($SiO_2$) have an eutectic point at 800° C. or more.

[8] The catalyst body described in any of the above [1] to [7], wherein the porous carrier has a porosity of 40 to 90%.

[9] The catalyst body described in any of the above [1] to [8], wherein the catalyst layer contains a compound of at least one noble metal element selected from the group consisting of platinum (Pt), palladium (Pd), and rhodium (Rh) in addition to the compound of the alkali metal and/or alkali earth metal.

[10] The catalyst body described in any of the above [1] to [9], wherein the porous carrier has a honeycomb form having a plurality of cells which are partitioned by partition walls and which constitute channels of a fluid.

[11] The catalyst body described in the above [10], wherein the porous carrier further comprises plugging portions which alternately plug inlet-side and outlet-side end faces of the plurality of cells.

[12] The catalyst body described in the above [10] or [11], wherein the porous carrier comprises a plurality of honeycomb segments, and the plurality of honeycomb segments are integrally bonded.

BEST MODE FOR CARRYING OUT THE INVENTION

Figure 1:
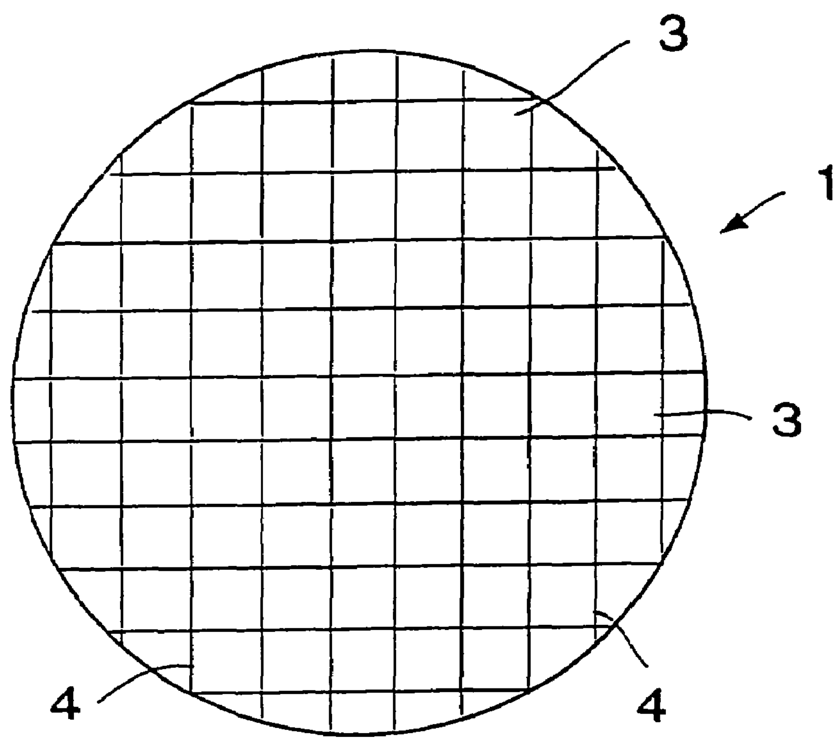
FIG. 1 is a schematic diagram showing an example of a honeycomb-shaped porous carrier.

In developing a catalyst body of the present invention, the present inventor has first studied a reason why a catalyst activity of a catalyst carrier formed of a nonoxide ceramic drops more than expected with respect to use time, when the carrier carries an alkali metal or the like, although the carrier does not originally easily react with the alkali metal or the like which is an $NO_x$ trap catalyst. As a result, the inventor has found a phenomenon in which the catalyst carrier formed of the nonoxide ceramic itself does not easily react with the alkali metal or the like, but oxide films are unavoidably formed on some of the surfaces of aggregate particles constituting the catalyst carrier, and the oxide film reacts with the alkali metal or the like to form low-melting glass. Since the alkali metal or the like is taken into the low-melting glass by the phenomenon, the catalyst activity rapidly drops.

Therefore, in the present invention, in the porous carrier containing the main component of the nonoxide ceramic or the like, an oxide film protective layer formed of a material which does not form the low-melting glass with the alkali metal or the like is disposed between the oxide film unavoidably formed on a part of the surface of the aggregate particles and a catalyst layer in such a manner as to coat at least a part of the oxide film. By this constitution, the reaction of the oxide film with the alkali metal or the like can be suppressed. Therefore, even in a case where the alkali metal or the like is carried as an $NO_x$ trap catalyst on the catalyst carrier formed of the nonoxide ceramic, it is possible to effectively prevent the drop of the catalyst activity.

A best mode for carrying out the catalyst body of the present invention will be specifically described hereinafter. It is to be noted that the "main component" mentioned in the present description means that the component occupies 50% or more by mass with respect to a total mass of all constituting components.

According to the present invention, there is provided a catalyst body comprising: a porous carrier in which a large number of aggregate particles containing a main component of a nonoxide ceramic and/or a metal are bonded to one another while the particles have a large number of pores; and a catalyst layer carried on the porous carrier and containing a compound of an alkali metal and/or an alkali earth metal, wherein the porous carrier has an oxide film unavoidably formed on a part of the surface of the aggregate particles, and an oxide film protective layer formed of a material which does not form low-melting glass with the alkali metal and/or alkali earth metal is further disposed between the oxide film and the catalyst layer in such a manner as to coat at least a part of the oxide film.

(1) Porous Carrier

The "porous carrier" mentioned in the present invention is a carrier for carrying a catalyst layer, and comprises a porous member in which a large number of aggregate particles are bonded to one another while having a large number of pores.

The "aggregate particles" constituting the "porous carrier" mentioned in the present invention are objects containing the main component of the nonoxide ceramic and/or metal.

Moreover, an object of the present invention is to suppress the reaction of the oxide film unavoidably formed on at least a part of the surface of the aggregate particles with the alkali metal or the like carried as the $NO_x$ trap catalyst. The aggregate particles need to have properties that the oxide films are unavoidably formed.

Therefore, the "porous carrier" in the present invention preferably comprises a nonoxide ceramic containing silicon element and/or metal silicon which is the main component. More specifically, the carrier preferably comprises a main component of at least one material selected from silicon carbide, metal silicon combined silicon carbide, and silicon nitride. The constitution of the present invention is especially effective in a case where the main component of the above-described oxide film is silica having high reactivity with the alkali metal or the like, but the oxide film containing a main component of silica is unavoidably formed on the surface of the nonoxide ceramic containing the silicon element or metal silicon.

The "porous carrier" in the present invention has a porosity of preferably 40 to 90%, further preferably 45 to 80%, especially preferably 50 to 70%. When the porosity is less than the range, as described later, there is unfavorably a possibility that a pressure loss increases in a case where a filter function is imparted to the catalyst. When exceeding the range, a necessary strength cannot be obtained in practical use. The porosity can be controlled by firing temperature or material blend composition. For example, when a ratio of the nonoxide ceramic or the like is decreased, and a glass phase is increased, a dense material having a small porosity can be prepared. Conversely, when an organic material (graphite, starch, etc.) is added to a raw material, and burnt out during firing to form pores, a porous material having a large porosity can be prepared. It is to be noted that the "porosity" mentioned in the present description is, needless to say, a porosity in a state before carrying the catalyst layer, and means a value measured by Archimedes process.

Moreover, in the catalyst body of the present invention, a shape of the porous carrier is not especially limited, and forms usually for use as the catalyst carrier may be used such as pellets, beads, rings, and foams. A honeycomb-shaped carrier is preferable which is provided with a plurality of cells partitioned by partition walls and constituting fluid channels, because filter characteristics (pressure loss, etc.) can be designed with high precision in a case where the function of the filter is imparted to the catalyst body as described later.

The "honeycomb shape" mentioned in the present description means a shape which is partitioned by remarkably thin partition walls 4 to form a plurality of cells 3 constituting fluid channels as in a porous carrier 1 shown in FIG. 1. The whole shape of the honeycomb is not especially limited. For example, in addition to a cylindrical shape shown in FIG. 1, examples of the shape include square pole shape, a triangle pole shape and the like.

Moreover, a honeycomb cell shape (cell shape in a section vertical to a cell forming direction) is not especially limited. For example, in addition to square cells shown in FIG. 1, examples of the cell include a hexagonal cell, a triangular cell and the like. In a circular cell, a quadrangular cell, or a polygonal cell, a thick catalyst is prevented from being attached to a corner portion in a cell section, and thickness of the catalyst layer can be uniform. Considering from a cell density, numerical aperture and the like, the hexagonal cell is preferable.

A honeycomb cell density is not especially limited, and is preferably in a range of 6 to 1500 cells/square inch (0.9 to 233 cells/cm$^2$) for use as the catalyst carrier as in the present invention. The thickness of the partition wall is preferably in a range of 20 to 2000 μm.

Furthermore, in the catalyst body of the present invention, when the porous carrier has the above-described honeycomb shape, the catalyst body preferably further comprises plugging portions for alternately plugging inlet-side and outlet-side end faces of a plurality of cells. By this memory, the function of the filter can be imparted to the catalyst body (catalyst carrying filter).

Figure 2:
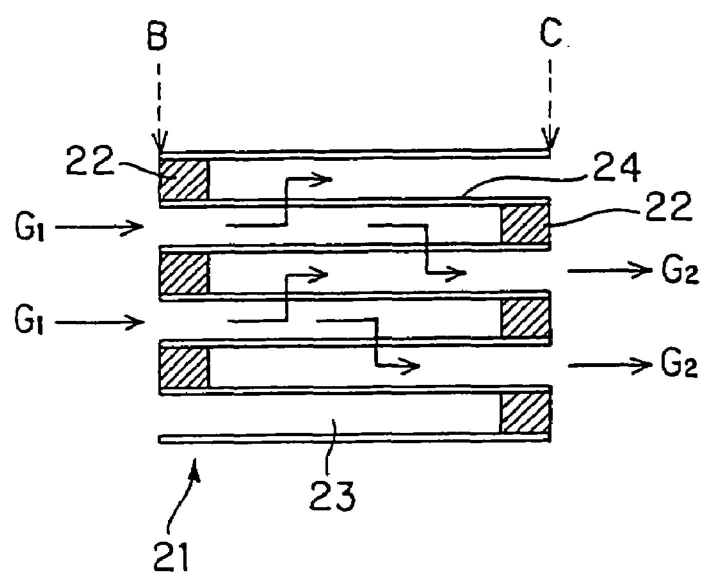
FIG. 2 is a schematic diagram showing an example of the honeycomb-shaped porous carrier comprising plugging portions.

For example, as shown in FIG. 2, according to a porous carrier 21 further comprising plugging portions 22 which alternately plug an inlet-side end face B and an outlet-side end face C of a plurality of cells 23, when a gas $G_1$ to be treated is introduced into the cells 23 from the inlet-side end face B, dust or particulates are captured in partition walls 24. On the other hand, a treated gas $G_2$ which has passed through the porous partition wall 24 to flow into the adjacent cell 23 is discharged from the outlet-side end face C, and therefore the treated gas $G_2$ can be obtained from which the dust or particulates in the gas $G_1$ to be treated have been separated.

Furthermore, in the catalyst body of the present invention, when the porous carrier has the above-described honeycomb shape, the carrier preferably comprises a plurality of honeycomb segments, and the plurality of honeycomb segments are integrally bonded (bonded member). As the ceramic constituting the porous carrier in the catalyst body or catalyst carrying filter, cordierite which is an oxide ceramic is representative. Since the nonoxide ceramic constituting the porous carrier in the catalyst body of the present invention has a large coefficient of thermal expansion as compared with cordierite, a heat stress by a temperature distribution increases. Therefore, by the structure of the above-described bonded member, the thermal stress is released, cracks by the thermal stress can be prevented, and a thermal shock resistance of the catalyst body can be improved.

When the catalyst body comprises a plurality of honeycomb segments, the size of each segment is not limited. However, when each segment is excessively large, an effect of improving the thermal shock resistance is reduced. On the other hand, when the segment is excessively small, integration of the respective segments by manufacturing or bonding is unfavorably complicated. Considering from this respect, as to a size of each segment, a sectional area (section vertical to a cell forming direction) is preferably 900 to 10000 mm$^2$, further preferably 900 to 5000 mm$^2$, especially preferably 900 to 3600 mm$^2$, and 70% or more by volume of the catalyst body preferably comprises the segment having this size.

As to the "porous carrier" in the present invention, for example, aggregate particle materials comprising the nonoxide ceramic and/or metal, and water are, if desired, mixed and kneaded with an organic binder (hydroxypropoxyl methyl cellulose, methyl cellulose, etc.), pore former (graphite, starch, synthetic resin, etc.), surfactant (ethylene glycol, fatty acid soap, etc.) and the like to form clay. The clay is formed into a desired shape, and dried to thereby obtain a formed article, the formed article is calcined to form a calcined article, and thereafter the calcined article can be fired to obtain the carrier.

It is to be noted that as a method of forming the porous carrier into the honeycomb shape, a method or the like is preferably usable in which the clay prepared as described above is extruded using a ferrule having a desired cell shape, partition wall thickness, and cell density. As a method in which the plugging portions are disposed in such a manner as to alternately plug the inlet-side and outlet-side end faces of a plurality of cells, there is a method or the like in which the honeycomb-shaped porous carrier is formed by extrusion, and dried, and thereafter cell openings are filled with clay having the same composition as that of the clay for forming.

(2) Oxide Film Protective Layer

The "oxide film protective layer" mentioned in the present description is constituted of the material which does not form the low-melting glass with the alkali metal and/or alkali earth metal, and is formed in such a manner as to coat at least a part of the above-described oxide film. In a portion in which this oxide film protective layer is disposed between a part of the oxide film and the catalyst layer, the above-described oxide film can be securely isolated from the catalyst layer, and the oxide film can be inhibited from being reacted with the alkali metal or the like carried as the $NO_x$ trap catalyst. Therefore, even when the alkali metal or the like is carried by the catalyst carrier formed of the nonoxide ceramic or the like, the catalyst activity can be effectively prevented from being degraded.

It is to be noted that in the present invention, since the porous carrier comprises the nonoxide ceramic or the like, the constituting material itself of the porous carrier does not react with the alkali metal or the like. Therefore, a constitution is not essential in which the whole surface of the porous carrier is coated with the oxide film protective layer, and a characteristic lies in that at least a part of the oxide film is sufficiently coated. On the other hand, as to the oxide ceramic (cordierite, etc.) which has heretofore been used as the constituting material of the catalyst carrier, the constituting material of the catalyst carrier itself reacts with the alkali metal or the like, and therefore the constitution is required in which the whole surface of the catalyst carrier is coated with a certain coating layer.

Specifically, examples of the "material which does not form the low-melting glass with the alkali metal and/or alkali earth metal" include a compound of at least one element selected from the following elements belonging to the group A. Since it is comparatively easy to use particulates such as oxide colloidal particles (zirconia ($ZrO_2$) sol, titania ($TiO_2$) sol, etc.) in forming the oxide film protective layer, a compound of at least one element selected from zirconium and titanium is preferable among the following elements belonging to the group A (e.g., zirconia, titania, etc.).

The group A: scandium, titanium, vanadium, chromium, manganese, iron, cobalt, nickel, copper, zinc, gallium, germanium, yttrium, zirconium, niobium, molybdenum, tin, and antimony.

More specifically, the "low-melting glass is not formed with the alkali metal and/or alkali earth metal" means that the oxide of the alkali metal and/or alkali earth metal, the "material which does not form the low-melting glass with the alkali metal and/or alkali earth metal", and silica have an eutectic point at 800° C. or more. The eutectic point is set to 800° C. or more in consideration of a temperature condition in an environment (automotive exhaust gas system) in which the catalyst body is actually disposed. It is assumed that the oxide film protective layer does not substantially react with the alkali metal or the like, when the eutectic point is 800° C. or more. Therefore, it is possible to suppress the reaction of the oxide film with the alkali metal or the like, and the drop of the catalyst activity can be effectively prevented.

A method of forming the oxide film protective layer is not especially limited. For example, there is a method or the like in which after wash-coating the porous carrier with a coating solution containing the "material that does not form the low-melting glass with the alkali metal and/or alkali earth metal", the carrier is thermally treated at high temperature and baked.

(3) Catalyst Layer

The "catalyst layer" mentioned in the present invention is a layer containing a compound of an alkali metal and/or alkali earth metal which is an $NO_x$ trap catalyst, and carried by the porous carrier.

In the catalyst body of the present invention, a type of the alkali metal or alkali earth metal carried as the $NO_x$ trap catalyst is not especially limited, examples of the alkali metal include lithium, sodium, potassium, cesium and the like, and examples of the alkali earth metal include calcium, barium, strontium and the like. Above all, potassium is especially preferably usable, because it is superior in $NO_x$ trap ability in a high-temperature range.

Moreover, the catalyst layer mentioned in the present invention may contain a compound of at least one noble metal element selected from platinum, palladium, and rhodium in addition to the compound of the above-described alkali metal and/or alkali earth metal. By these noble metals, nitrogen monoxide (NO) in the exhaust gas is reacted with oxygen ($O_2$) to generate nitrogen dioxide ($NO_2$) before the alkali metal or the like traps nitrogen oxide. When once trapped nitrogen oxide is discharged, combustible components in the exhaust gas is reacted with nitrogen oxide to detoxify nitrogen oxide, and a capability of purifying nitrogen oxide is preferably enhanced. Since catalyst components such as alkali metals and noble metals are carried in highly scattered states, the components are preferably once carried by heat-resistant inorganic oxide having a large specific surface area, like alumina, and thereafter carried by the porous carrier.

As to the catalyst body of the present invention, another purifying material applicable to an exhaust gas system may be carried together with the $NO_x$ trap catalyst, the purifying material including a catalyst component other than the $NO_x$ trap catalyst represented by a tertiary catalyst, auxiliary catalyst represented by oxide of cerium (Ce) and/or zirconium, hydro carbon (HC) adsorbing material or the like. In this case, the $NO_x$ trap catalyst and these purifying materials may be carried in a mixed state, but the respective components are more preferably stacked and carried in such a manner as to form independent layers. Furthermore, the $NO_x$ trap catalyst and these purifying materials are carried by separate carriers, and these carriers are preferably appropriately combined for use in the exhaust gas system.

A method of forming the catalyst layer is not especially limited, but, for example, there is a method or the like in which the porous carrier including the oxide film protective layer formed thereon is wash-coated with a catalyst solution containing catalyst components, thereafter thermally treated at high temperature, and baked.

EXAMPLES

The present invention will be described hereinafter more specifically in accordance with examples, but the present invention is not limited to these examples. It is to be noted that as to an average particle diameter of an aggregate particle material in the following examples and comparative examples, a value of a 50% particle diameter was used. The value was measured by an X-ray transmission type grain-size distribution measurement apparatus (e.g., Sedigraph 5000-02 type, etc. manufactured by Shimazu Corp.) in which Stokes liquid-phase sedimentation process is used as a measuring principle, and detection is performed by an X-ray transmission process.

[Manufacturing of Porous Carrier]

(Carrier 1)

As aggregate particles, a total of 100 parts by mass were prepared including: 80 parts by mass of silicon carbide having an average particle diameter of 50 μm; and 20 parts by mass of metal silicon powder having an average particle diameter of 5 μm. Moreover, 10 parts by mass of hydroxypropyl methyl cellulose which was an organic binder, 10 parts by mass of starch which was a pore former, and an appropriate amount of water were added to 100 parts by mass of aggregate particles, and mixed/kneaded by a vacuum kneader to prepare clay.

By an extruding method using a ferrule having a cell shape, partition wall thickness, and cell density described later, the above-described clay was formed into a honeycomb shape, and thereafter dried by a drying method by combination of hot-air drying and microwave drying to obtain a honeycomb-shaped formed article. As the whole shape of the obtained formed article, an end face (cell opening face) had a 35 mm×35 mm square shape, a length was 152 mm, each cell had a 1.2 mm×1.2 mm square shape, each partition wall had a thickness of 310 μm, a cell density was 46.5 cells/cm$^2$ (300 cells/square inch), and a total cell number was 576 cells.

The formed article was calcined (degreased) at about 400° C. for five hours in the atmosphere to thereby obtain a calcined article, and this calcined article was fired in an argon atmosphere at about 1450° C. for two hours to obtain a porous carrier (metal silicon bonded silicon carbide). In the porous carrier, a porosity measured by Archimedes process was 52%, and an average pore diameter measured by a mercury press-in process was 20 μm. This "porous carrier" is referred to as "Carrier 1".

(Carrier 2)

As aggregate particles, 100 parts by mass of metal silicon powder were prepared having an average particle diameter of 20 μm. Moreover, 10 parts by mass of hydroxypropyl methyl cellulose which was an organic binder, 10 parts by mass of starch which was a pore former, and an appropriate amount of water were added to 100 parts by mass of aggregate particles, and mixed/kneaded by a vacuum kneader to prepare clay.

By an extruding method using a ferrule having a cell shape, partition wall thickness, and cell density described later, the above-described clay was formed into a honeycomb shape, and thereafter dried by a drying method by combination of hot-air drying and microwave drying to obtain a honeycomb-shaped formed article. As the whole shape of the obtained formed article, an end face (cell opening face) had a 35 mm×35 mm square shape, a length was 152 mm, each cell had a 1.2 mm×1.2 mm square shape, each partition wall had a thickness of 310 μm, a cell density was 46.5 cells/$cm^2$ (300 cells/square inch), and a total cell number was 576 cells.

The formed article was calcined (degreased) at about 400° C. for five hours in the atmosphere to thereby obtain a calcined article, and this calcined article was fired in a nitrogen atmosphere at about 1450° C. for two hours to obtain a porous carrier (silicon nitride). In the porous carrier, a porosity measured by Archimedes process was 52%, and an average pore diameter measured by a mercury porosimeter was 10 μm. This "porous carrier" is referred to as "Carrier 2".

[Forming of Oxide Film Protective Layer]

Carriers 1 and 2 described above were wash-coated with titania sol of a commercially available nitric acid solution or zirconia sol of the nitric acid solution, and accordingly an oxide film protective layer was formed in such a manner as to coat at least a part of an oxide film formed on the surfaces of the aggregate particles constituting the above-described carriers. A coating amount was defined in terms of mass per unit volume of the porous carrier, and any amount of 5 g/L, 25 g/L, 50 g/L was used. When the coating amount did not reach a predetermined value by one wash-coating time, the wash-coating was repeated until the predetermined value was reached. Thereafter, thermal treatment was performed on a condition at 700° C. for 1 hour to perform baking.

[Preparation of Catalyst Solution and Formation of Catalyst Body]

A commercially available γ-alumina (γ-$Al_2O_3$) powder (specific surface area: 200 $m^2$/g) was immersed in a solution obtained by mixing an aqueous solution of diamino platinum nitrite ($(NH_3)_2Pt(NO_2)_2$) and an aqueous solution of potassium nitrate ($KNO_3$), and stirred in a pot mill for two hours. Thereafter, a water content was evaporated, and the material was dried/solidified, soft-crushed, and fired in an electric furnace at 600° C. for 3 hours. A commercially available alumina ($Al_2O_3$) sol and water content were added to thus obtained (platinum+potassium) containing γ-alumina powder ((Pt+K)-predoped γ-$Al_2O_3$), and again wet-crushed in the pot mill to prepare a catalyst solution (slurry for wash-coating).

A carrying amount of potassium was adjusted into 20 g/L per porous carrier volume. An amount relation between γ-alumina, platinum, and potassium was adjusted in such a manner that a potassium carrying amount was 20 g/L (per porous carrier volume) and a platinum amount was 30 g/cft (1.06 g/L) (per porous carrier volume, mass of a platinum element base) in a stage in which the porous carrier constituting the catalyst carrier was wash-coated with a catalyst solution, and finally subjected to a heat treatment. As to an added amount of an alumina sol, an amount of a solid content was set to 5 mass % of total alumina in terms of alumina, and the water content was appropriately added in such a manner that the catalyst solution indicated such a viscosity that facilitates the wash-coating.

The porous carrier constituting the catalyst carrier was immersed in the obtained catalyst solution, an excess solution in the cell was blown off, and the cells were dried. The obtained potassium carrier was thermally treated in the electric furnace at 600° C. for 1 hour to prepare a catalyst body. It is to be noted that any oxide film protective layer was not formed, and a catalyst layer was formed on Carrier 1 to obtain Comparative Example 1, whereas any oxide film protective layer was not formed, and a catalyst layer was formed on Carrier 2 to obtain Comparative Example 2.

(Evaluation of Potassium Diffusion Suppression Degree)

With regard to each catalyst body, while 10% (volume %) of a water content coexisted, an acceleration durability test was performed in such a manner as to retain the catalyst body at 750° C. for 30 hours. Before/after the testing, a degree of scattering of potassium (potassium diffusion suppression degree) was evaluated by a potassium concentration distribution diagram measured by an energy scattering type spectrometer. Results are shown in Table 1. It is to be noted that in the evaluation, the diffusion degree of potassium before/after the acceleration durability test was used as a standard. When potassium hardly diffused, and the degree was substantially equal to that before the test, the degree was evaluated as A. When potassium slightly diffused, the degree was evaluated as B. When most of potassium diffused, the degree was evaluated as C. When potassium hardly remained in its original position, the degree was evaluated as D.

TABLE 1

| | Porous carrier | Oxide film protective layer: Substance name | Oxide film protective layer: Coating amount (g/L) | Evaluation Potassium diffusion suppression degree |
|---|---|---|---|---|
| Example 1 | Carrier 1 | Titania | 5 | B |
| Example 2 | Carrier 1 | Titania | 25 | A |
| Example 3 | Carrier 1 | Titania | 50 | A |
| Example 4 | Carrier 1 | Zirconia | 25 | A |
| Example 5 | Carrier 1 | Zirconia | 50 | A |
| Example 6 | Carrier 2 | Titania | 25 | A |
| Example 7 | Carrier 2 | Zirconia | 25 | A |
| Comparative Example 1 | Carrier 1 | None | — | D |
| Comparative Example 2 | Carrier 2 | None | — | D |

(Result)

As apparent from the results shown in Table 1, it has been found that the diffusion of potassium can be effectively suppressed in the catalyst bodies of Examples 1 to 7. That is, it has been supposed that a drop of catalyst activity can be effectively prevented in a case where an alkali metal or the like that is an $NO_x$ trap catalyst is carried by a catalyst carrier formed of a nonoxide ceramic and/or a metal. On the other hand, in the catalyst bodies of Comparative Examples 1 and 2, the diffusion of potassium can hardly be suppressed. It is to be noted that although not shown in Table 1, similar results were indicated even in a case where the catalyst component was changed from potassium to sodium or lithium, and evaluated.

INDUSTRIAL APPLICABILITY

As described above, in a catalyst body of the present invention, an oxide film protective layer formed of a material which does not form low-melting glass with an alkali metal or the like is disposed between an oxide film unavoidably formed on a part of the surface of an aggregate particle, and a catalyst layer in such a manner as to coat at least a part of the oxide film in a porous carrier containing a main component of a nonoxide ceramic. Therefore, it is possible to effectively prevent a drop of catalyst activity in a case where the alkali metal or the like which is an $NO_x$ trap catalyst is carried by a catalyst carrier formed of the nonoxide ceramic.

The invention claimed is:

1. A catalyst body comprising:

a porous carrier in which a large number of aggregate particles containing a main component of a nonoxide ceramic and/or a metal are bonded to one another while a large number of pores are disposed; and a catalyst layer carried on the porous carrier and containing a compound of an alkali metal and/or an alkali earth metal, wherein the porous carrier consists essentially of aggregate particles bonded to each other, an oxide film unavoidably formed from material of the aggregate particles on a part of the surface of the aggregate particles, and an oxide film protective layer formed of a material which does not form low-melting glass with the alkali metal and/or alkali earth metal used as a $NO_X$ trap catalyst that is further disposed on the oxide film so as to coat at least a part of the oxide film.

2. The catalyst body according to claim 1, wherein the porous carrier contains a main component of the nonoxide ceramic containing a silicon (Si) element and/or metal silicon.

3. The catalyst body according to claim 1, wherein the porous carrier contains a main component of at least one selected from the group consisting of silicon carbide (SiC), metal silicon bonded silicon carbide (Si—SiC), and silicon nitride ($Si_3N_4$).

4. The catalyst body according to claim 1, wherein the oxide film contains a main component of silica ($SiO_2$).

5. The catalyst body according to claim 4, wherein an oxide of the alkali metal and/or alkali earth metal, the material which does not form the low-melting glass with the alkali metal and/or alkali earth metal, and silica ($SiO_2$) have an eutectic point at 800° C. or more.

6. The catalyst body according to claim 1, wherein the material which does not form the low-melting glass with the alkali metal and/or alkali earth metal is a compound of at least one element selected from elements belonging to the group A:

the group A: scandium (Sc), titanium (Ti), vanadium (V), chromium (Cr), manganese (Mn), iron (Fe), cobalt (Co), nickel (Ni), copper (Cu), zinc (Zn), gallium (Ga), germanium (Ge), yttrium (Y), zirconium (Zr), niobium (Nb), molybdenum (Mo), tin (Sn), and antimony (Sb).

7. The catalyst body according to claim 6, wherein the material which does not form the low-melting glass with the alkali metal and/or alkali earth metal is a compound of at least one element selected from the group consisting of zirconium (Zr) and titanium (Ti) among the elements belonging to the group A.

8. The catalyst body according to claim 1, wherein the porous carrier has a porosity of 40 to 90%.

9. The catalyst body according to claim 1, wherein the catalyst layer contains a compound of at least one noble metal element selected from the group consisting of platinum (Pt), palladium (Pd), and rhodium (Rh) in addition to the compound of the alkali metal and/or alkali earth metal.

10. The catalyst body according to claim 1, wherein the porous carrier has a honeycomb form having a plurality of cells which are partitioned by partition walls and which constitute channels of a fluid.

11. The catalyst body according to claim 10, wherein the porous carrier further comprises plugging portions which alternately plug inlet-side and outlet-side end faces of the plurality of cells.

12. The catalyst body according to claim 10, wherein the porous carrier comprises a plurality of honeycomb segments, and the plurality of honeycomb segments are integrally bonded.

13. The catalyst body according to claim 1, wherein the aggregate particles include a main component comprising of at least one material selected from silicon metal, silicon carbide or a mixture thereof.

* * * * *